Jan. 26, 1932.                W. RHODES                1,842,800
                        ROADWAY ILLUMINATING DEVICE
                          Filed Aug. 9, 1929        2 Sheets-Sheet 1
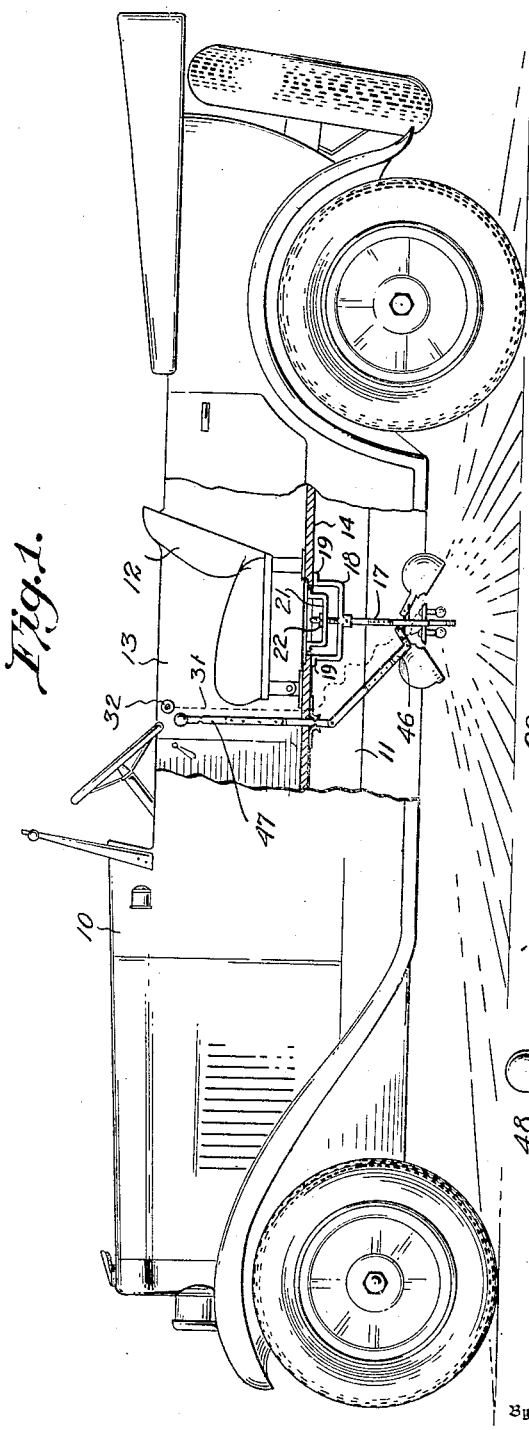
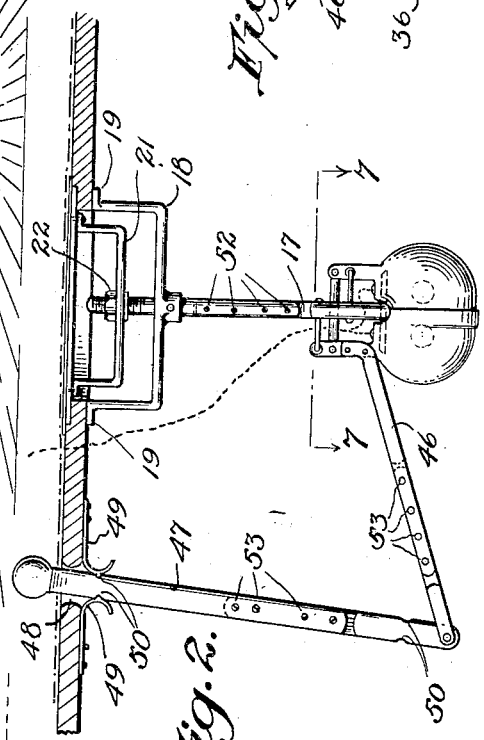
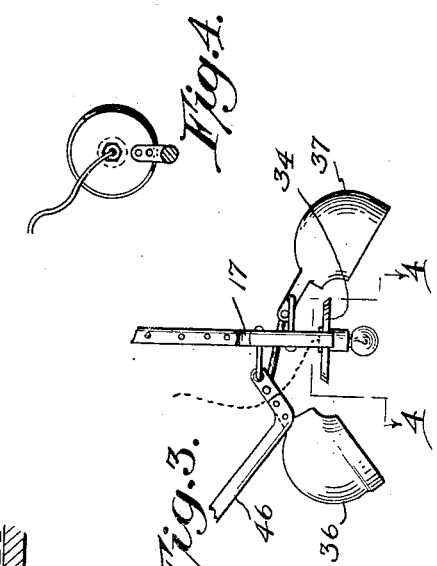
Inventor
Waymond Rhodes
Fay, Oberlin & Fay Attorney Jan. 26, 1932.  W. RHODES  1,842,800
ROADWAY ILLUMINATING DEVICE
Filed Aug. 9, 1929    2 Sheets-Sheet 2
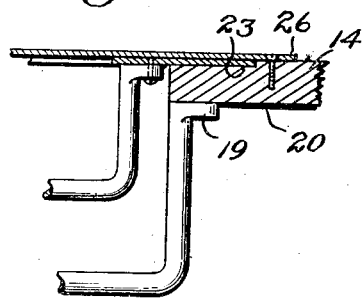
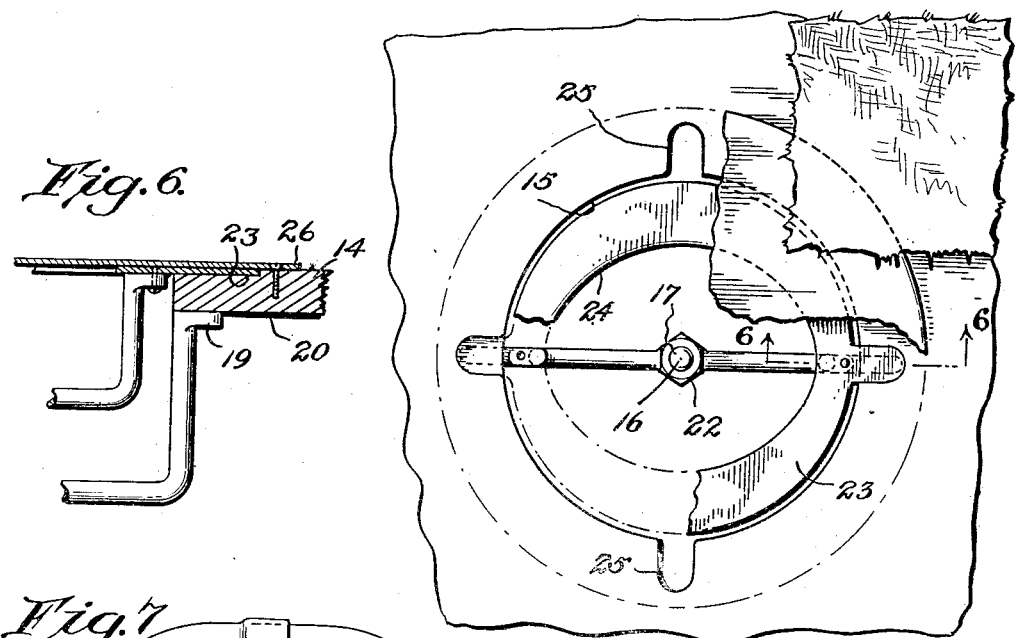
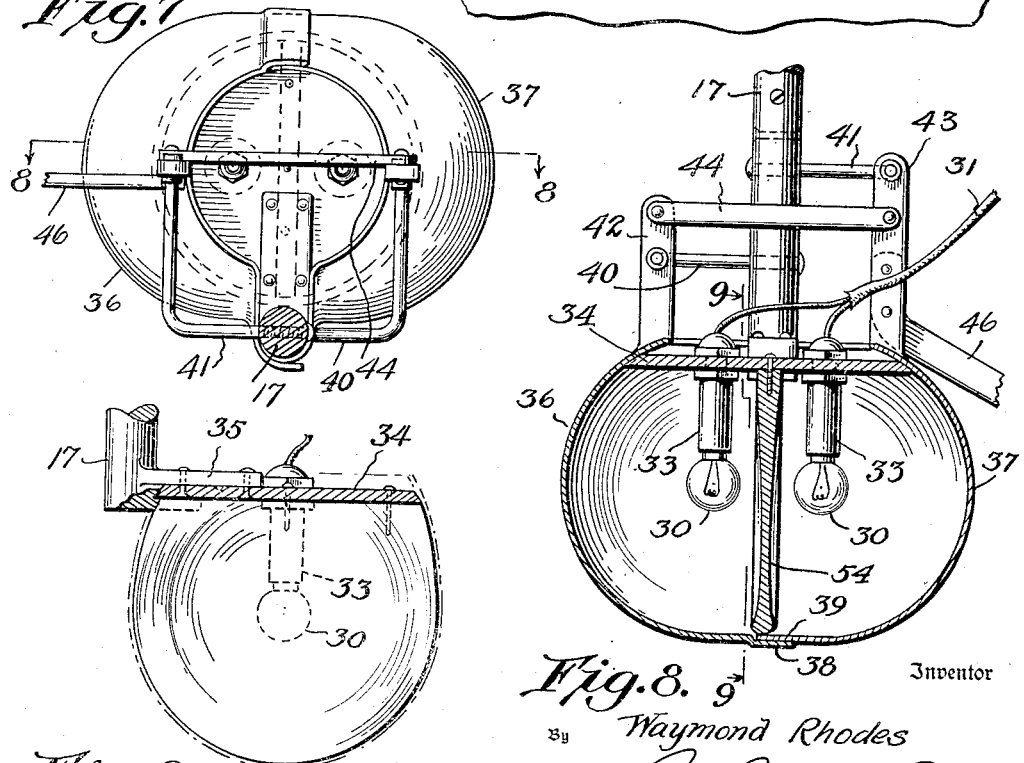
Inventor
Waymond Rhodes Patented Jan. 26, 1932

1,842,800

UNITED STATES PATENT OFFICE

WAYMOND RHODES, OF DAYTONA BEACH, FLORIDA

ROADWAY ILLUMINATING DEVICE

Application filed August 9, 1929. Serial No. 384,565.

This invention, relating as indicated to roadway illuminating devices, refers more particularly to a novel device adapted for attachment to a motor vehicle to illuminate the ground area beneath such vehicle. The improved device is especially advantageous when driving at night on narrow or rough roads in disclosing to approaching vehicles the exact width and character of the roadway where the vehicles must pass. It is contemplated by this invention to position the present illuminating device so that there will be no possibility of glaring in the eyes of approaching vehicles.

To the accomplishment of the foregoing and related ends, said invention, then, consists of the means hereinafter fully described and particularly pointed out in the claims; the annexed drawings, and the following description setting forth in detail certain mechanism embodying the invention, such disclosed means constituting, however, but one of various mechanical forms in which the principle of the invention may be used.

In said annexed drawings:—

Fig. 1 is a side elevation of an automobile illustrating a preferred embodiment of my invention;

Fig. 2 is an enlarged view of a portion of the floor board of such vehicle showing the method of mounting the present illuminating device thereon;

Fig. 3 is a view similar to Fig. 2 showing the device in its opened position;

Fig. 4 is a view taken on line 4—4 of Fig. 3;

Fig. 5 is a top plan view of the floor board area directly above the present illuminating device;

Fig. 6 is a detail sectional view taken on line 6—6 of Fig. 5;

Fig. 7 is a plan view of the reflector elements of this invention as taken on line 7—7 of Fig. 2;

Fig. 8 is a longitudinal vertical sectional view through the elements illustrated in Fig. 7 as taken on line 8—8 of Fig. 7 and Fig. 9 is a transverse vertical section taken on line 9—9 of Fig. 8.

In the illustrated embodiment of this invention I have shown a preferred form in which the improved illuminating device is mounted at the underside of an automobile floor board and has operating elements, the purpose of which will be described later, controllable from the operator's compartment i. e. in such position as would be engaged by persons sitting in the driver's seat. The automobile is illustrated generally at 10 and consists of the usual frame 11, front seats 12, driver's compartment 13, and floor board 14.

As stated above, it is intended by this invention, to provide at the underside of a motor vehicle means for illuminating the roadway directly beneath the same to make visible to approaching vehicles the irregularities therein or the exact width of the car on which the device is mounted and also its relative position with respect to the sides of the road. While the invention may be embodied in many forms, the one to be presently described is so constructed that it may be readily assembled from the upper side of the floor board. This is to preclude the necessity of crawling underneath the vehicle for adjusting such device. As seen in Figs. 1, 2, 5 and 6 the floor board 14 is provided with a substantially annular vertical hole 15 in which is mounted the vertical support 16 of my device. Such support comprises a vertical rod or bar 17 having attached thereto midway its ends an inverted U shaped bracket 18 the latter provided with footed portions 19 which engage the underside 20 of the floor board 14 when in assembled position, as shown best in Fig. 6. Also carried by the rod 17 is a second inverted footed U shaped bracket 21 the latter, however, being slidable on the rod 17 and fixed relatively thereto by the nut 22. The member 21 has fixed to its footed portions a cover plate 23 which serves to cover the hole 15 in the floor board and acts to hold the rod 17 in vertical position when the nut 22 is screwed toward the bracket 18, it being understood that the plate 23 overlies the sides of opening 15 to grip the floor board between such portion and the feet 19. The plate 23 may, as shown in Fig. 5, be provided with an opening 24 through which the hand may be inserted for adjusting the nut 22. It should be explained that the floor board 14 is provided with, in addition to the opening 15, laterally projecting slots 25 through which the feet 19 may pass in the assembling of the device. A cover plate or similar article 26 may be screwed to the floor board as seen in Fig. 6 to cover the entire device, and the floor covering placed directly thereon. In the embodiment shown in Fig. 1 my improved illuminating device is shown directly beneath the front seat of the motor vehicle which, of course, eliminates the necessity for providing the plate 26.

At the lower end of the vertical support rod 17 is carried the electrical means for throwing light on the roadway beneath the vehicle. This may be in the form of one or more electric bulbs 30 connected to a source of current 31 which leads to a switch 32 in the driver's compartment. The bulbs 30 are carried in sockets 33 depending from a horizontal plate 34 mounted by means of a lateral foot 35 at the lower extremity of rod 17.

Also carried by the lower end of the supporting structure 17 are reflector elements 36 and 37 which, as seen in the drawings, are semi-spherical in form and have their inner faces highly finished so that when in open position as seen in Figs. 1 and 3, they reflect the light from the bulbs 30 downwardly to the roadway. It is desirable to provide for the prevention of an accumulation of dirt and dust in and about my illuminating device during the operation of the automobile in the daytime. Accordingly I have so constructed such device that the reflectors 36 and 37 in conjunction with the plate 34 serves to completely enclose the bulbs 30 when in the position seen in Fig. 2. The plate 34 is made preferably circular and the reflector 36 with a flange 38 to overlie the facing edge 39 of reflector 37 thus making a practically dust proof casing when closed.

Means operable from the driver's compartment are provided to cause the opening or closing of the reflector devices. Each of the reflectors 36 and 37 are pivotally mounted upon lateral projecting elements 40 and 41 fixed to the lower end of rod 17, the reflectors being provided at their upper sides with projecting arms 42 and 43. A link 44 connects the arms 42 and 43 to insure their simultaneous operation both in the opening and closing, it being seen from Fig. 8 that this link is attached to the respective arms 42 and 43 at opposite sides of their pivotal connecting points. Attached to one of the arms 42 or 43 is one end of an operating arm 46, the other end of such arm is connected to a vertically movable handle or bar 47 which passes through an opening 48 in the floor board of the automobile and extends within the driver's compartment 13. Latching devices 49 engaging the recesses 50 in the handle 47 are provided to lock the reflector either opened or closed. The operation of the handle 47 will at once be clear from an inspection of Figs. 1, 2, and 3 of the drawings.

On account of variation of automobile sizes and height of their floor boards from the ground, I have made my improved device with adjustments in each of the operating connections and mounting elements so as to adapt the same for all sizes of motor vehicles. The vertical rod 17 is made in two pieces as seen in Fig. 2 which are adjustably held together by means of screws or bolts 52. Likewise is the arm 46 and the handle 47 made in two pieces and held together by similar bolts 53.

The operation and advantage of the present novel roadway illuminating device should be at once apparent from an understanding of the foregoing description, it being clear that during the daytime by a simple manipulation of the handle 47 the entire device may be closed and not affected by the dust of the road. Likewise at night the reflectors may be opened by the simple operation of raising the handle 47 within the driver's compartment and the switch 32 put on and off at will to illuminate the roadway beneath the motor vehicle. If desired the reflection to the front and rear of the vehicle may be augmented by positioning the two bulbs 30 on either side of a vertical reflector plate 54. This plate is screwed to the underside of the horizontal plate 34 by means of bolts as shown.

Other modes of applying the principle of my invention may be employed instead of the one explained, change being made as regards the mechanism herein disclosed, provided the means stated by any of the following claims or the equivalent of such stated means be employed.

I therefore point out and distinctly claim as my invention:—

1. In a device of the character described, the combination with a motor vehicle of a support mounted on the underside of said vehicle, an illuminating device carried thereby, semi-spherical reflectors associated with said device and means for closing said reflectors to totally encompass said illuminating device.

2. In a device of the character described, the combination with a motor vehicle of illuminating means mounted thereon adapted to illuminate the road beneath said vehicle, a support mounted on the underside of said vehicle, an illuminating device carried thereby, a pair of semi-spherical reflectors mounted on said support adjacent said device, said reflectors being adapted in one position to completely enclose said device and means operable from within the vehicle for actuating said reflectors.

3. In a device of the character described, the combination with a motor vehicle of illuminating means mounted thereon adapted to illuminate the road beneath said vehicle, a support mounted on the underside of said vehicle, an illuminating device carried thereby, a pair of semi-spherical reflectors mounted on said support adjacent said device, said reflectors being adapted in one position to completely enclose said device, an operating handle within the driver's compartment of said vehicle, and link and lever between said handle and said reflectors for actuating the latter.

4. In a device of the character described, the combination with a motor vehicle of illuminating means mounted thereon adapted to illuminate the road beneath said vehicle, a pair of semi-spherical reflectors pivotally mounted adjacent said illuminating means and adapted in one position to completely enclose the same, operating means projecting within the vehicle's driver's compartment, and connections between the latter and said reflectors.

5. In a device of the character described, the combination with a motor vehicle of a vertically adjustable support mounted on the underside of said vehicle, a horizontal plate carried at the lower end of said support, an illuminating device carried beneath said plate, a pair of semi-spherical reflectors mounted on said support and associated with said plate to direct light rays downwardly to all sides of the vehicle, said reflectors being adapted in one position to completely enclose and shield said illuminating device.

6. In a device of the character described, the combination with a motor vehicle of a support mounted at the underside of the vehicle floor board, means for removably securing such support in position, an illuminating device mounted at the lower end of said support, a pair of semi-spherical reflectors carried by said support and adapted to move toward and away from said illuminating device and in one position to completely enclose said illuminating device, and means for actuating said reflectors.

7. In a device of the character described, the combination with a motor vehicle of a support mounted at the underside of the vehicle floor board, means for removably securing such support in position, an illuminating device mounted at the lower end of said support, a pair of semi-spherical reflectors carried by said support and adapted to move toward and away from said illuminating device and in one position to completely enclose said illuminating device, an operating handle projecting within said vehicle and link and lever connections between the latter and said reflectors.

8. In a device of the character described, the combination with a motor vehicle of a support mounted at the underside of the vehicle floor board, means for removably securing such support in place, a vertically adjustable depending element on said support, an illuminating device carried at the lower end of said element and reflector means associated with said device for directing light rays downwardly toward the road.

I hereunto affix my signature.

WAYMOND RHODES.